(No Model.)
M. SWEET.
HALTER OR TIE FOR ANIMALS.
No. 299,179. Patented May 27, 1884.
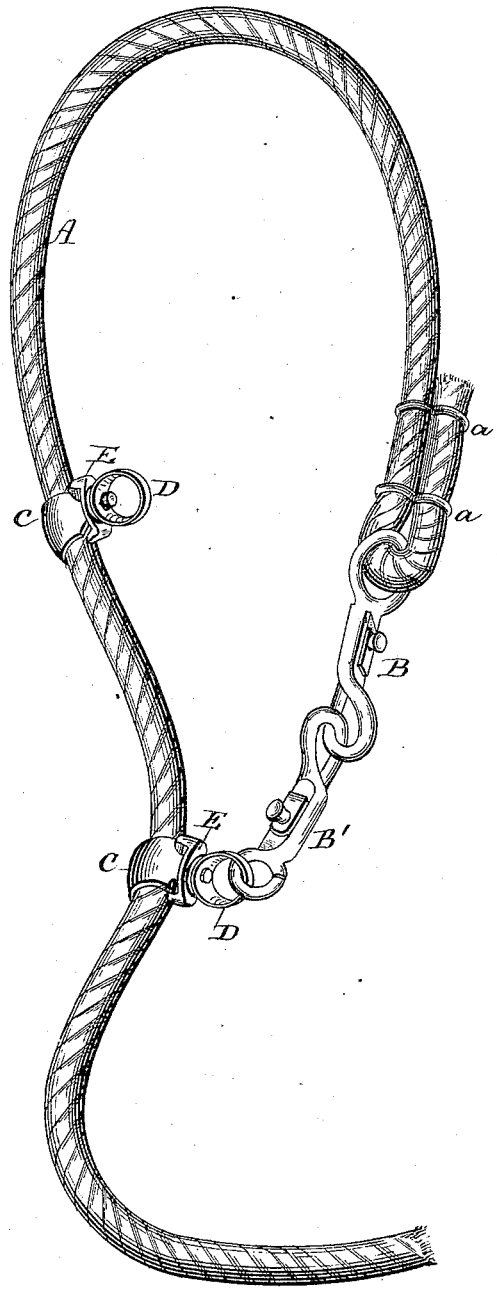
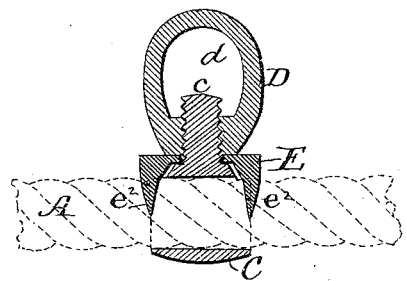
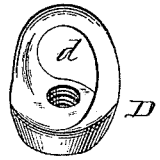
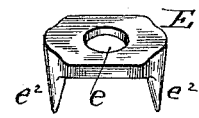
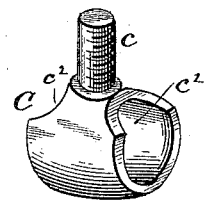
Witnesses:
L. C. Hills
W. B. Masson
Inventor
Miles Sweet,
by E. E. Masson
atty.

United States Patent Office.

MILES SWEET, OF TROY, NEW YORK, ASSIGNOR TO THE SWEET & CLARK MANUFACTURING COMPANY, OF SAME PLACE.

HALTER OR TIE FOR ANIMALS.

SPECIFICATION forming part of Letters Patent No. 299,179, dated May 27, 1884.

Application filed April 3, 1884. (No model.)

*To all whom it may concern:*

Be it known that I, MILES SWEET, a citizen of the United States, residing at Troy, in the county of Rensselaer and State of New York, have invented certain new and useful Improvements in Halters or Ties for Horses and Cattle, of which the following is a specification, reference being had therein to the accompanying drawings, in which—

Figure 1 is a perspective view of my invention secured to a rope, and forming a part of a tie suitable for hitching horses. Fig. 2 is a longitudinal section of the same. Fig. 3 represents the three parts detached from each other, forming the rope-clamping device.

My invention relates to improvements in clamps used upon rope halters or cattle-ties to connect one end of said rope with the body thereof at any desired point; and the objects of my improvement are to provide said clamp with at least two sharp-pointed prongs to enter the body of the rope at both ends of the thimble-ring, thus distributing the impinging surfaces more evenly upon the rope and preventing cutting of its fibers at one point.

The invention will first be described in connection with the drawings, and then be pointed out in the claims.

A portion of a halter-rope is shown at A. It has one end doubled over to retain a snap-hook, B, the doubled end being secured to the body of the rope by means of short lengths of twine or wire, as shown at $a$. At a suitable distance from that doubled end is secured upon the rope A the clamp forming the main part of my invention. This clamp is formed of three parts that can be easily cast of metal. The part C is in the form of a tubular ring having a laterally-projecting stem, $c$, that is screw-threaded to receive the nut D, and the latter has projecting from its upper surface a bail or handle, $d$, forming therewith a round eye to receive the hooked end of the snap-fastening B. Between the body of the ring C and the nut D there is placed upon the stem $c$ a flat plate, E, having a central perforation, $e$, and a prong, $e^2$, at each end thereof, to enter the body of the rope at both ends of the thimble-ring C. To permit the length of the plate E to be about the same as that of the thimble-ring, a segment of the latter is cut out at $c^2$ on each side of the stem $c$ for the passage of the prongs $e^2$, and to permit them to become nested into the fibers of the rope at points where it is well supported by the thimble-ring. When this clamping device is thus secured upon a halter-rope and the latter placed around a horse's neck, there is no danger of the rope working loose or getting tight around his neck; but yet it can be promptly adjusted to any position upon the rope, and after the hook of the snap-fastening has entered the eye of the nut D the latter cannot work loose.

If desired, a snap-hook, B', may be permanently secured to the eye of the nut D, as shown in Fig. I, and be used as a lever to rotate the nut D and force the prongs of the plate E deeply into the strands of the rope; and the snap-hook B' may be made to engage with a plain ring, or with the snap-hook B, secured to the doubled end of the rope.

Although the clamp is shown as attached to a rope, it may as securely be connected to a leather strap by simply changing the form of the part C to correspond therewith.

Having now fully described my invention, I claim—

1. In an animal-tie, the combination of a tubular ring having a laterally-projecting stem, a nut provided with a bail or eye, and a plate provided with a central perforation and prongs, substantially as and for the purpose described.

2. The combination of the tie A, the tube C, having a laterally-projecting stem, the nut D, provided with a bail, $d$, a snap-fastening, and a plate E, provided with a central perforation, and prongs at both ends, substantially as and for the purpose described.

In testimony whereof I affix my signature in presence of two witnesses.

MILES SWEET.

Witnesses:
WM. A. GRIPPIN,
WM. SHAW.